(12) United States Patent
Lanzo et al.

(10) Patent No.: US 9,473,950 B2
(45) Date of Patent: Oct. 18, 2016

(54) METHOD FOR THE PREDICTION OF COVERAGE AREAS OF A CELLULAR NETWORK

(75) Inventors: Roberto Lanzo, Turin (IT); Loris Paolo Stola, Turin (IT); Alessandro Leoni, Turin (IT)

(73) Assignee: TELECOM ITALIA S.p.A., Milan (IT)

(*) Notice: Subject to any disclaimer, the term of this patent is extended or adjusted under 35 U.S.C. 154(b) by 521 days.

(21) Appl. No.: 13/977,345

(22) PCT Filed: Dec. 30, 2010

(86) PCT No.: PCT/EP2010/070923
§ 371 (c)(1),
(2), (4) Date: Jun. 28, 2013

(87) PCT Pub. No.: WO2012/089268
PCT Pub. Date: Jul. 5, 2012

(65) Prior Publication Data
US 2013/0281100 A1    Oct. 24, 2013

(51) Int. Cl.
*H04W 40/00* (2009.01)
*H04W 16/24* (2009.01)
*H04W 16/18* (2009.01)
*H04W 16/22* (2009.01)

(52) U.S. Cl.
CPC ............ *H04W 16/24* (2013.01); *H04W 16/18* (2013.01); *H04W 16/22* (2013.01)

(58) Field of Classification Search
CPC .... H04W 24/02; H04W 16/18; H04W 16/02
See application file for complete search history.

(56) References Cited

U.S. PATENT DOCUMENTS

| 6,173,185 B1* | 1/2001 | Bernardin ............ H04W 16/18 455/421 |
| 2003/0073442 A1 | 4/2003 | Fattouch |
| 2007/0270153 A1 | 11/2007 | Lanzo et al. |
| 2007/0281706 A1 | 12/2007 | Stola et al. |

FOREIGN PATENT DOCUMENTS

| EP | 1 283 643 | 2/2003 |
| WO | 2005 076645 | 8/2005 |
| WO | 2005 076646 | 8/2005 |

OTHER PUBLICATIONS

Kuerner, Thomas, et al., "Concepts and Results for 3D Digital Terrain-Based Wave Propagation Models: An Overview", IEEE Journal on Selected Areas in Communications, vol. 11, No. 7, pp. 1002-1012, (Sep. 1, 1993) XP 000400010.
International Search Report Issued Sep. 22, 2011 in PCT/EP10/070923 filed Dec. 30, 2010.

* cited by examiner

*Primary Examiner* — Shantell L Heiber
(74) *Attorney, Agent, or Firm* — Oblon, McClelland, Maier & Neustadt, L.L.P.

(57) ABSTRACT

A method predicting coverage area of a radiocommunications network including plural network cells distributed over a geographic area. The method includes calculating by simulation an irradiated electromagnetic field irradiated by a radio base station of the network in plural measure locations within the geographic area corresponding to respective expected positions of a user terminal. The calculating includes, for each measure location, calculating a basic transmission curve indicative of a basic attenuation of a radioelectric signal strength in the measure location, and associating to the basic transmission curve at least one correction factor for refining the radioelectric signal strength basic attenuation by taking account of shielding effects on the radioelectric signal strength due to obstacles to the propagation of the radioelectric signal.

15 Claims, 8 Drawing Sheets

METHOD FOR THE PREDICTION OF COVERAGE AREAS OF A CELLULAR NETWORK

BACKGROUND OF THE INVENTION

1. Field of the Invention

The present invention generally relates to radiocommunications network planning. More particularly, the present invention relates to radiocommunications planning of a network for mobile terminals, including a number of (large or small) cells distributed over a particular geographic area or territory.

2. Overview of the Related Art

A radiocommunication network system making use of the concept of cellular network enables significant increase of overall system capacity, but requires planning and dimensioning process for radiocommunication network apparatus operating in the radiocommunication network system. A first phase of such planning and dimensioning process is computing the so-called coverage area, i.e., extent and features of an operative region around a radio base station wherein radioelectric signals (i.e., electromagnetic signals propagating as waves over the air) radiated out from the radio base station and received by a mobile terminal (typically, a user terminal) are still able to ensure predefined requirements for a satisfactory quality of service. Usually, such predefined requirements comprise radioelectric strength (or other parameters related thereto) of the radioelectric signal received by the user terminal and radiating out from the radio base station.

A traditional coverage area computation, sometimes also referred to as coverage area prediction, is carried out by a proper algorithm using a low environment resolution data, i.e., by taking into account data describing the features of the environment within elementary areas, generally known as pixels, having a side of 50 or 100 meters. An example of coverage area algorithm is called RASPUTIN (Radio Strength Prediction Using Territorial Inputs), which is a propagation model tool that takes into account different aspects of radioelectric propagation phenomena for predicting coverage area of a single radio base station; more particularly, such aspects typically may include both radioelectric signal strength radiated therefrom (i.e., power radiating out from the radio base station) and databases information about territory (morphological, urbanization and orographic factors), which are combined to each other in order to predict the radioelectric signal propagation from the radio base station, and thus loss phenomena from which to evaluate coverage area of the radio base station.

Specifically, the propagation model implemented in RASPUTIN algorithm splits the radioelectric propagation phenomena into two main components: smooth earth effects and shadowing effects of the orographic obstacles. The smooth earth effects of the radioelectric propagation phenomena are taken into account by considering basic propagation curves, according to semi-empirical relationships which consider radioelectric signal power and frequency, effective height of the radio base station (i.e., of transmitting element or antenna thereof) with respect to the user terminal, distance from the radio base station and the user terminal, and without considering other parameters. In other words, the basic propagation curves are indicative of the radioelectric signal strength attenuation, also known as radioelectric signal propagation loss, in an open area, i.e., an area empty of trees, buildings or architectural structures made by human beings.

To the radioelectric signal strength attenuation or radioelectric signal propagation loss is then applied a correction factor given by building density and vegetation or greenery effects. More particularly, in RASPUTIN the effects due to local urbanization around the user terminal relate to the building density parameter, which is a surface parameter defined as percentage of area covered by buildings, with reference to a given standard grid size (for example, 230× 230 m). Such a parameter usually ranges from very low values (<5%) for open (rural) zones, to values above about 60-70% for very densely built-up areas (historical town centers). This approach provides a quantitative identification of the type of the area under examination. Furthermore, RASPUTIN propagation model evaluates also the effects of greenery on the radioelectric signal propagation starting from knowledge of the vegetated areas distribution.

The shadowing effects due to orographic obstacles are instead taken into account by considering more complex propagation models, which require an interaction with territorial data bases. Starting from a radio base station, RASPUTIN algorithm scans the surrounding area along radial directions with a suitable angular step (typically, 0.5 degrees). For each direction, a data base interface provides the radial terrain height profile along which the field strength computation should be performed.

RASPUTIN algorithm considers the diffraction effects by using a prediction model based on the Huyghens-Fresnel diffraction theory. Accordingly, a single obstacle is assumed to be a perfectly absorbing half-plain screen ("knife-edge" approach), whose diffraction effects can be easily calculated, as long as the signal wavelength is negligible with respect to obstacle size and distances from both transmitting and receiving sites. The approximation consists of supposing the obstacle having no thickness along the propagation direction and being infinitely extended in the orthogonal section, respectively, and neglecting its real electromagnetic properties. In other words, starting from orographic parameters, an altimetric profile is determined all along each scanning line, and the interaction effects with the possible natural obstacles arranged along the scanning lines (involving radioelectric signal strength attenuation) are computed by resorting to the classic Huyghens-Fresnel theory, according to which such interaction effects may be assessed with adequate reliability by replacing each natural obstacle with an equivalent virtual obstacle (screen) having a knife edge shape, a height equal to the natural obstacle, an infinitesimal thickness, endlessly extending perpendicularly to the propagation direction, and perfectly absorbing the incident electromagnetic signal.

In the state of the art, other solutions are known for predicting areas coverage.

For example, in Stankovic, Z.; Milovanovic, B.; Veljkovic, M.; Dordevic, A "*The hybrid-neural empirical model for the electromagnetic field level prediction in urban environments*", 2004 Seventh Seminar on Neural Network Applications in Electrical Engineering (IEEE Cat. No. 04EX871), is presented an application of multilayer perceptron networks for calculating electromagnetic wave path loss in an urban environment for propagation through an area with low or high buildings. A hybrid neural-empirical model, created in two phases, is proposed. The first phase implies the realization of an approximate (coarse) propagation model based on measured values. This model determines the propagation loss from the beginning of the area, based on the distance from the area beginning, the average building density, the partial loss of a single building, the distance from the transmitter and the exponential loss index of the area. In the second phase, a neural network and the approximate model are integrated in the hybrid (fine) model of the propagation area. The input parameters for the neural network are the distance from the area beginning and the average height of buildings in that area, while the output parameter is the partial loss of a single building. This value is used in the approximate model, in order to obtain the propagation area model with higher accuracy.

In Balis, P. G.; Hinton, O. R. Author Affiliation, Panafon S A, Athens, Greece, "*UTD-based model for prediction of propagation path loss and shadowing variability in urban mobile environments*", IEE Proceedings—Microwaves, Antennas and Propagation, vol. 144 no. 5, pp. 367-71, a new uniform-theory-of-diffraction (UTD-) based approach for cellular-mobile-radio-propagation modeling is presented. Buildings are represented as conducting halfplanes or screens, and the model includes the effect of building-height variation along all intervening screens between base station and mobile. The proposed model has a low computational complexity and could be applicable to small urban cells over regular terrain, with buildings of nonuniform height. Results from the model seem to be in very close agreement with experimental observations (at 465 MHz, 927 MHz and 851 MHz), and seem to accurately predict observed trends in the dependence of path loss and its variability on frequency, range, building-height variation and screen spacing.

Moreover, in Ichitsubo, S., Kimura, M. "*A propagation model for mobile radio propagation loss in an urban area at 800 MHz*", Electronics and Communications in Japan, Part 1 (Communications), vol. 76, no. 10, pp. 91-104, there is proposed a method to understand the propagation structure of the microcells with a tall and medium-height antenna in an urban area; by founding fundamental propagation parameters and constructing the structural model of the propagation loss. The fundamental propagation parameters were obtained based on the multivariable analysis of the propagation data at 800 MHz measured in the Tokyo Metropolitan area. These parameters are the distance between the transmitter and receiver, the average building height between the transmitter and receiver, and the base-station height which have high correlation and regression coefficients with the propagation loss. The relationship of parameters obtained from the model is (20-alpha)log(h) for the base-station height characteristics and (alpha-20)log(H) for the building height characteristics if the distance characteristics are alphalog(d). The relationships of coefficients of the conventional estimation equation and the regression equation obtained by the measured data almost agreed with those of the model so that the validity of the model was confirmed.

SUMMARY OF INVENTION

Although widely used, RASPUTIN algorithm has drawbacks that may preclude a wider use of the same. In particular, the fact that the correction factor introduced into the radioelectric signal strength attenuation is based on punctual or surface environment data (building density), limits the modeling on a single measure pixel (i.e., pixel under prediction) to which the punctual or surface data refers to, without substantially considering shielding effects on the measure pixel caused by pixels that are at a prescribed neighborhood relationship thereto (e.g., the pixels before the measure pixel wherein the user terminal is placed, hereinafter referred to generically as previous pixels). A clear example of such problem relates to the impossibility of distinguishing propagation channels, such as those that are encountered in urban center along buildings-surrounded streets that are "aligned" and "transversal" with respect to the directions of the wave front of the electromagnetic wave associated to the signal. More generally, the modeling of building (and greenery) effect on the measure pixel implemented by RASPUTIN algorithm does not consider shielding effects caused by buildings (and greenery) located in the previous pixels; in this way, for the same other conditions, on a visible pixel (i.e., a measure pixel not obstructed by buildings located in the previous pixels) is forecast the same field value of an obstructed pixel (i.e., a pixel obstructed by buildings).

Concerning the document Stankovic, Z.; Milovanovic, B.; Veljkovic, M.; Dordevic, A "*The hybrid-neural empirical model for the electromagnetic field level prediction in urban environments*", the Applicant has observed that such solution, involves a certain implementation complexity since based on neural networks.

Concerning the document Balis, P. G.; Hinton, O. R. Author Affiliation, Panafon SA, Athens, Greece, "*UTD-based model for prediction of propagation path loss and shadowing variability in urban mobile environments*", the Applicant has observed that such solution has a quite difficult approach, since it is based on ray approach (ray launching o ray tracing) and hence on physic-geometrical optics.

In view of the foregoing, the Applicant has tackled the problem of devising a solution suitable to provide a new simple and effective coverage area prediction algorithm.

More particularly, the Applicant has found that by including volume parameters (such as for example, building and greenery volume parameter) into already existing algorithms (such as for example RASPUTIN algorithm), it is possible to obtain an improved precision of coverage area prediction without substantially involving an increase of costs and/or computation time requested.

One or more aspects of the solution according to an embodiment of the invention are set out in the independent claims, with advantageous features of the same solution that are set forth in the dependent claims (whose wording is enclosed herein verbatim by reference).

More particularly, the solution according to one or more embodiments of the present invention relates to a method for predicting coverage area of a radiocommunications network including a plurality of network cells distributed over a geographic area. The method includes calculating by simulation an irradiated electromagnetic field irradiated by a radio base station of the network in a plurality of measure locations within the geographic area corresponding to respective expected positions of a user terminal. Said calculating comprises, for each of said measure locations, calculating a basic transmission curve indicative of a basic attenuation of a radioelectric signal strength in the measure location, associating to the basic transmission curve at least one correction factor for refining the radioelectric signal strength basic attenuation by taking account of shielding effects on the radioelectric signal strength due to obstacles to the propagation of the radioelectric signal. In the solution according to one or more embodiments of the present invention, the phase of associating to the basic transmission curve at least one correction factor includes calculating, for a measure elementary area which the measure location is associated to, at least one equivalent volume parameter indicative of an equivalent volume of said obstacles taking into account a plurality of neighbor elementary areas in a prescribed neighborhood relationship to the measure elementary area, and calculating an equivalent volume correction factor by associating each one of the at least one equivalent volume parameter to a corresponding parametric curve expressing the signal attenuation as a function of the respective at least one equivalent volume parameter.

Advantageously, the at least one correction factor includes an equivalent building correction factor indicative of shielding effects due to building obstacles present within the measure elementary area and the corresponding neighbor elementary areas.

The phase of calculating a basic transmission curve may conveniently comprise performing a point-to-point field calculation between the radio base station and the measure location, performing a radial cycle procedure including a repetition of the point-to-point field calculation procedure on measure locations, identified by a predefined radial sampling pitch, that are placed along a selected radial included between the radio base station and a maximum distance of calculation, and performing an angular cycle procedure including a repetition of the radial cycle procedure on all the radials placed at an angular distance equal to a predefined angular sampling pitch with respect to the selected radial. The method may further include calculating for each measure location of a considered radial an average building volume parameter that takes into account punctual building volumes of the corresponding measure elementary area and of a predetermined number of the neighbor elementary areas that are located between the radio base station and the measure elementary area along the considered radial, calculating, for each considered radial, an equivalent building volume parameter from all the average building volume parameters, by performing an average operation, weighted with the inverse of the distance from the radio base station, of all the average building volume parameters provided along the considered radial, and associating to a building parametric curve the computed equivalent building volume parameter for obtaining the corresponding equivalent building correction factor for fining the propagation attenuation given by the basic transmission curve.

For example, the phase of calculating for each measure elementary area of a considered radial a corresponding average building volume parameter may be obtained by subdividing the territory in first elementary areas having a first resolution (with each first elementary area that may comprise a number of second elementary areas having a second resolution higher than the first resolution), computing, from a number of second elementary areas occupied by buildings provided by high resolution databases, a urbanized density parameter representing, for each first elementary area, a percentage of the number of second elementary areas included in each first elementary area that are occupied by buildings, computing a building average height parameter representing, for each first elementary area occupied mainly by buildings, an average height of heights associated to the second elementary areas included in the first elementary area occupied by buildings, and computing the average building volume parameter by multiplying the urbanized density parameter to the building average height parameter.

Advantageously, the method may further include setting a minimum building height threshold for the building average height parameter, below which the building average height parameter is considered zero since the buildings are not considered relevant for shielding purposes.

The building parametric curve may be obtained by a calibration process preferably, but not necessarily comprising, identifying a reference propagation algorithm substantially based on the basic transmission curve (with the reference propagation algorithm that provides field prediction values), identifying calibration measures adapted to calibrate the equivalent building volume attenuation contribute (with such calibration measures that may properly include continuous wave measures and network in exercise measures), computing a distribution of a difference between field prediction values and the calibration measures as a function of the equivalent building volume, and calculating the building parametric curve as the interpolating of the distribution that minimizes the standard deviation between the field predictions values and the calibration measures.

Additionally or alternatively, the at least one correction factor may includes an equivalent greenery correction factor indicative of shielding effects due to greenery obstacles provided within the measure elementary area corresponding to the measure location and the neighbor elementary areas thereof.

More particularly, the method may further include calculating for each measure location of a considered radial an average greenery volume parameter that takes into account punctual greenery volumes of the corresponding measure elementary area and of a predetermined number of the neighbor elementary areas along the considered radial, calculating, for each considered radial, an equivalent greenery volume parameter from all the average greenery volume parameters, by performing an average operation, weighted with the inverse of the distance from the user terminal, of all the average greenery volume parameters provided along the considered radial, and associating to a greenery parametric curve the computed equivalent greenery volume parameter for obtaining the corresponding equivalent greenery correction factor for fining the propagation attenuation given by the basic transmission curve.

The phase of calculating for each measure location of a considered radial a corresponding average greenery volume parameter may be carried out by computing, from a number of second elementary areas occupied by greenery provided by high resolution databases, a greenery density parameter representing, for each first elementary area, a percentage of the number of second elementary areas included in each first elementary area that are occupied by greenery, by computing a greenery average height parameter representing, for each first elementary area occupied by greenery, an average height of heights associated to the second elementary areas included in the first elementary area occupied by greenery, and by computing the average greenery volume parameter by multiplying the greenery density parameter to the greenery average height parameter.

The greenery parametric curve can be obtained by a calibration process preferably, but not necessarily, comprising identifying a reference propagation algorithm substantially based on the basic transmission curve (with the reference propagation algorithm that provides field prediction values), identifying further calibration measures adapted to calibrate the equivalent greenery volume attenuation contribute (with such further calibration measures that may properly include continuous wave measures and network in exercise measures), computing a distribution of a difference between field prediction values and the further calibration measures as a function of the equivalent greenery volume, and calculating the greenery parametric curve, as the interpolating of the distribution that minimizes the standard deviation between the field predictions values and the further calibration measures.

Advantageously, the calibration measures and the further calibration measures are performed in regions that can be considered substantially free from shielding effects due to obstacles different from buildings and greenery, respectively.

Said calculating a basic transmission curve indicative of a basic attenuation of a radioelectric signal strength in a measure location may includes calculating the basic transmission curve as a function of operative parameters comprising at least one between distance between the radio base station and the user terminal, working frequency, effective height of the radio base station with respect to the user terminal, height of the user terminal with respect to a ground level.

In order to obtain better prediction accuracy, the at least one correction factor may further include an orographic correction factor indicative of shielding effects due to diffraction by orographic obstacles.

Another aspect of the solution according to embodiments of the present invention relates to a computer program loadable into an internal memory of a computer with input units and output units as well as with a processing unit. The computer program comprises executable software adapted to carry out the method phases of above, alone or in combination, when running in the computer.

A further aspect of the solution according to embodiments of the present invention relates to a system for predicting coverage area of a radiocommunications network including a plurality of network cells distributed over a geographic area. The system comprises means configured for calculating by simulation an irradiated electromagnetic field irradiated by a radio base station of the network in a plurality of measure locations within the geographic area corresponding to respective expected positions of a user terminal. Said means are also configured for calculating, for each of said measure locations, a basic transmission curve indicative of a basic attenuation of a radio electric signal strength in the measure location, and for associating, for each of said measure locations, at least one correction factor to the basic transmission curve for refining the radioelectric signal strength basic attenuation by taking account of shielding effects on the radioelectric signal strength due to obstacles to the propagation of the radioelectric signal. Said means can be further configured for calculating for a measure elementary area which the measure location is associated thereto at least one equivalent volume parameter indicative of an equivalent volume of said obstacles taking into account a plurality of neighbor measure elementary areas in a prescribed neighborhood relationship to the measure elementary area, and for calculating an equivalent volume correction factor by associating each one of the at least one equivalent volume parameter to a corresponding parametric curve expressing the signal attenuation as a function of the respective at least one equivalent volume parameter.

Thanks to the present invention, it is possible to obtain a new effective algorithm based on a preexisting algorithm. In particular, the new algorithm allows obtaining a more precise coverage area prediction, which involves a better radio resources allocation planning (thereby functionally maximizing the exploitation of the radio resources during the dimensioning process and thus reducing implementation costs of the network apparatus), without substantially causing a significant modification of the preexisting algorithm (with relevant advantages also in terms of time waste during the planning process).

BRIEF DESCRIPTION OF THE ANNEXED DRAWINGS

These and other features and advantages of the present invention will be made apparent by the following description of some exemplary and non limitative embodiments thereof; for its better intelligibility, the following description should be read making reference to the attached drawings, wherein.

DETAILED DESCRIPTION OF PREFERRED EMBODIMENTS OF THE INVENTION

Figure 1:
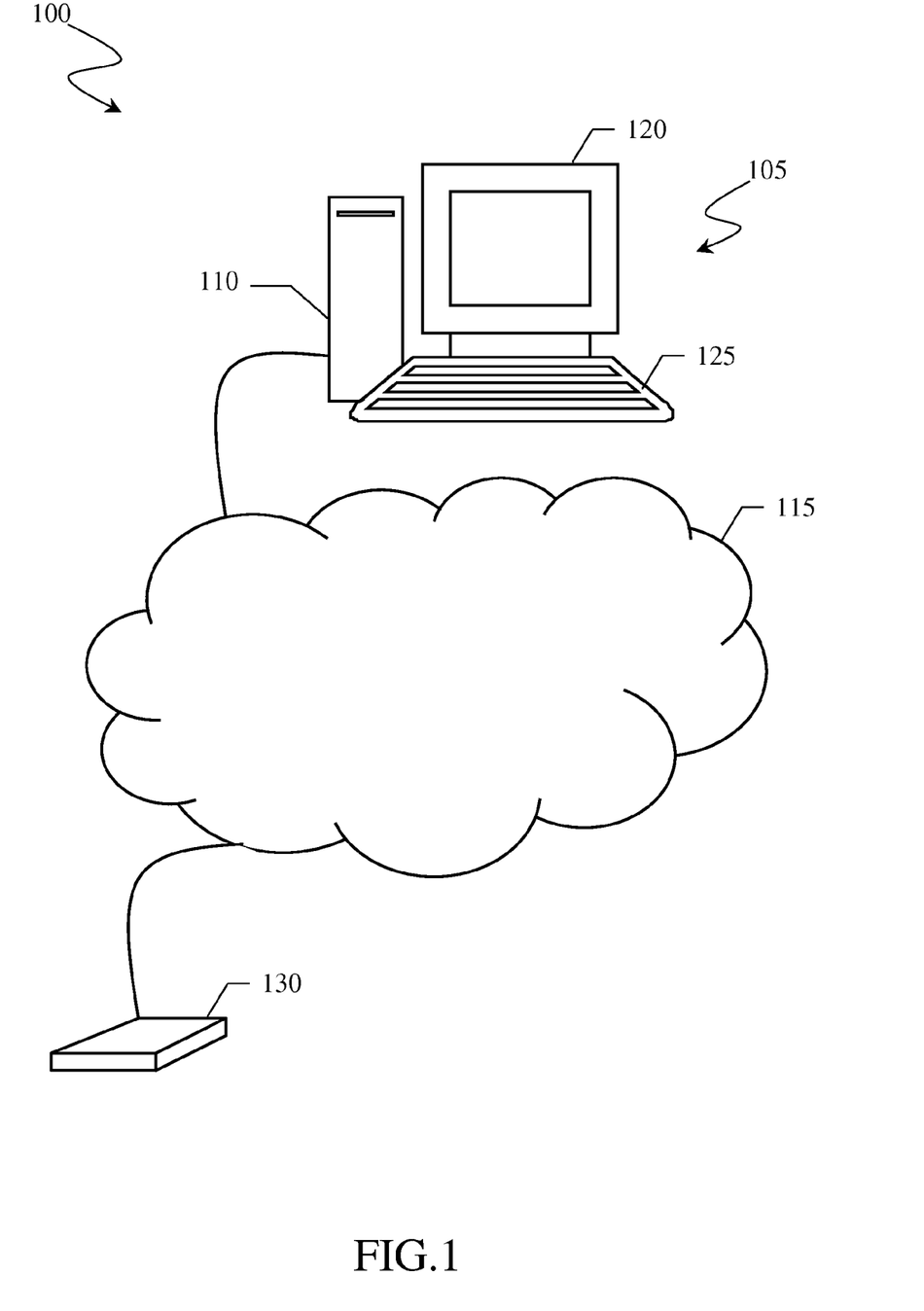
FIG. 1 shows a work station programmed to allow radiocommunications network planning according to the present invention.

With reference to the drawings, and particularly to FIG. 1, the latter shows a processing system for planning a radiocommunications network for mobile terminals. The processing system, designated as a whole by 100, essentially comprises a work station 105, for example a Hewlett Packard J5000 with a 450 MHz CPU, 1 Gbyte RAM, 18 Gbyte hard disk and UNIX operating system, having a central processing unit 110 connected to a local area network 115, an internal hard disk (not shown) storing reference databases, a display 120 and a keyboard 125. Should the databases exceed the hard disk storage capacity, the work station 105 may also be provided with an external hard disk 130 connected to central processing unit 110 directly or (as exemplary depicted in the figure) through the local area network 115.

The work station 105 is configured to allow radiocommunications network planning on the basis of computer program modules which run on the central processing unit 110 and implementing the planning method according to the present invention, with the aid of the reference databases stored in the internal hard disk or in the external hard disk 130. More particularly, computer program modules include a propagation algorithm able to predict coverage area, and planning and dimensioning modules able to plan and dimension radio resources for the radiocommunication network according to the prediction performed by the propagation algorithm.

Figure 2:
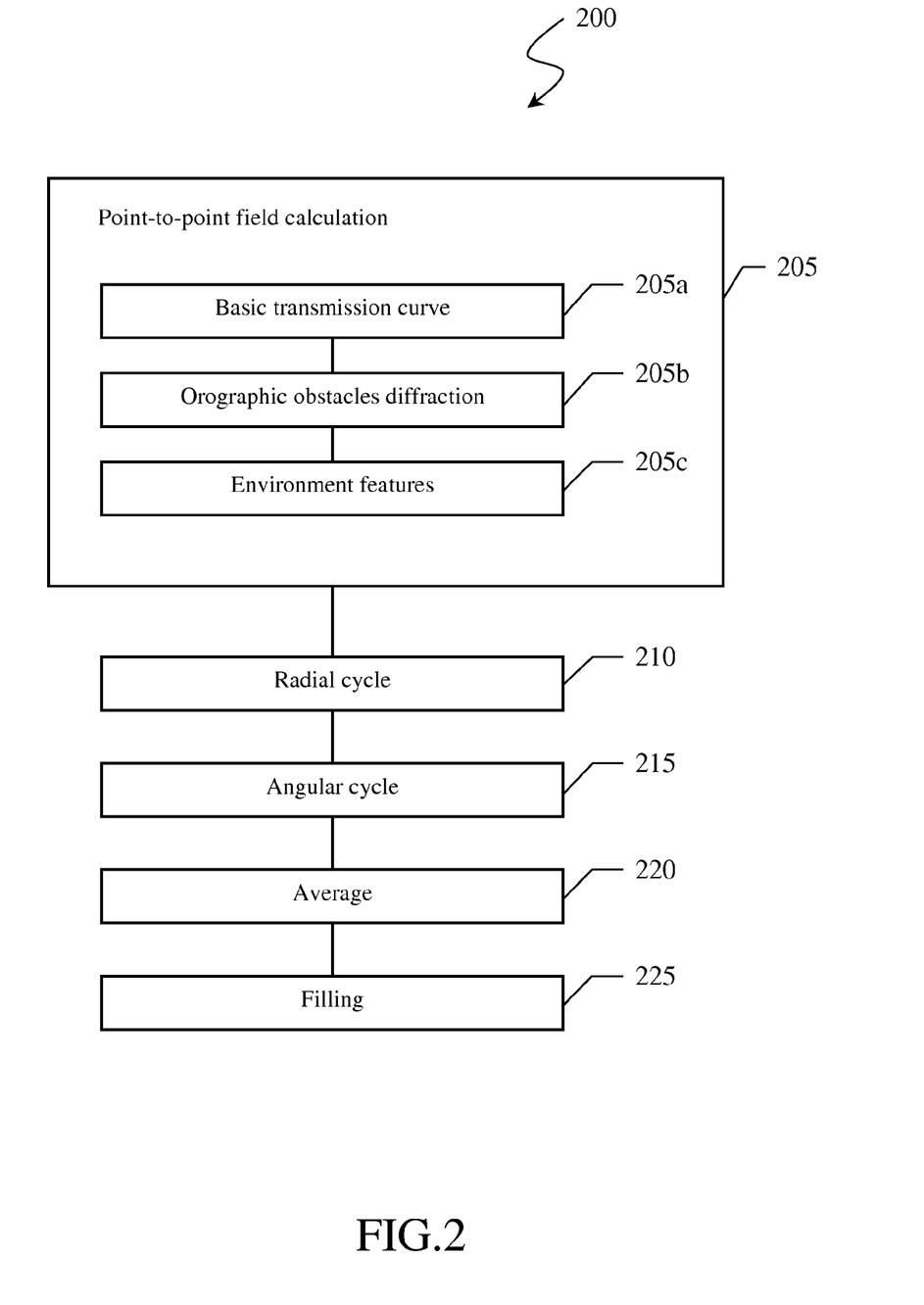
FIG. 2 schematically shows an operation flow of a propagation algorithm according to a solution known in the state of the art.

With reference now to FIG. 2, there is shown a schematic block diagram illustrating the operation flow of a propagation algorithm 200 according to a solution known in the state of the art (for example, based on RASPUTIN—Radio Strength Prediction Using Territorial Inputs—algorithm), and in which the solution according to an embodiment of the present invention may be conveniently employed. Generally speaking, the propagation algorithm 200 performs a calculation of a coverage area matrix (or simply coverage area calculation) of a given radio base station, i.e., a data communications station which is geographically fixed and which is typically made up of antennas, amplifiers, receivers, and transmitters, and similar hardware and software for sending and receiving signals and converting them between radio frequency signals and other signals (for example, audio signals).

More particularly, the coverage area calculation is based on an "exploration" of the territory surrounding the radio base station according to the following procedures:

point-to-point field calculation (block 205); such procedure performs a point-to-point field calculation between the radio base station and a user terminal (i.e., between a point, or location, occupied by the radio base station and a measure point, or measure location, occupied by the user terminal—with such measure location that is associable, as will be better understood by the following description, to a corresponding measure pixel of a plurality of pixels through which the territory or geographic area can be subdivided).

radial cycle (block 210); such procedure performs a repetition of the point-to-point field calculation procedure on measure points, identified by a predefined radial sampling pitch (for example, a 25 m radial sampling pitch), that are placed along a selected radial included between the radio base station and a maximum distance of calculation. This is substantially equivalent to position the user terminal on the measure points that are placed along the selected radial at a distance of the predefined radial sampling pitch (i.e., 25 m in the example at issue) from each other and to perform, for each one of such points, the point-to-point field calculation procedure 205.

Angular Cycle (block 215); such procedure performs a repetition of the radial cycle procedure 210 on all the radials placed at an angular distance equal to a predefined angular sampling pitch with respect to the selected radial (i.e., during the angular cycle procedure 215 the point-to-point field calculation procedure 205 is performed for each one of the radials placed at the angular distance defined by an integer multiple of the angular sampling pitch). At the end of the angular cycle procedure 215, a pixels matrix with a plurality of calculated field values is obtained, with a certain number of explored pixels (i.e., measure pixels that are associated to a predetermined number of calculated field values), and a number of unexplored pixels (i.e., measure pixels that are associated to a number of calculated field values being lower than the predetermined number).

Average (block 220); such procedure determines an average field value on the explored pixels.

Filling (block 225); such procedure is performed starting from the radio base station and calculates the field value on each unexplored pixel as the average field value of the explored pixels that are placed around the corresponding unexplored pixel.

As known from RASPUTIN algorithm, the point-to-point field calculation procedure 205 of above defines an estimation (prediction by simulation) rather than a calculation; in fact, the point-to-point field calculation procedure 205 performs calculations based on a more or less complex representation (or modeling) of the territory surrounding the user terminal. More particularly, the RASPUTIN algorithm typically performs the field-to-field calculation procedure 205 basing on a set of complex model components (described below) corresponding to different physical phenomena:

Basic transmission curve (205*a*); such model component represents a propagation equation that calculates a signal attenuation around the territory surrounding the user terminal as a function of the following parameters:
Distance between the radio base station and the user terminal,
Working frequency,
Effective height of the radio base station (i.e., of the center of radiation thereof) with respect to the user terminal,
Height of the user terminal with respect to a reference (or ground) level.

In other words, the basic transmission curve generally expresses a semi-empiric relation indicative of the radioelectric signal strength attenuation, also known as propagation loss, in a open area, i.e., an area empty of trees, buildings or architectural structures made by human beings, as a function of the parameters of above.

Orographical obstacles diffraction (205*b*); such model component has the purpose of determining the signal attenuation due to the diffraction caused by orographical obstacles, and is based substantially on the tight rope algorithm (in turn based on the multi-screen Huygens-Fresnel theory and on knife-edge modeling of multiple obstacles).

Such model component introduces a correction factor to be applied to the basic transmission curve for fining the radioelectric signal attenuation loss prediction.

Environment features (205*c*); such model component has the purpose of determining the signal attenuation due to building (urbanization) and morphology of the environment around the user terminal (i.e., as will be shortly discussed, building and morphology of the environment present within the measure pixel which the measure point occupied by the user terminal is associated thereto). More particularly, RASPUTIN algorithms usually make use of databases providing building density (i.e., percentage of pixels being occupied by buildings) and morphology (based on a classification of the pixels according to predetermined greenery distribution, such as for example tick wood, sparse wood, lawn lined with trees, open green areas, and the like) for determining a punctual contribution of the signal contribution that takes into account the environment feature only of the measure pixel which the user terminal is associated thereto. Such model component introduces a further correction factor to be applied to the basic transmission curve (and to the correction factor introduced by the model component 205*b*) for fining the radioelectric signal attenuation loss prediction.

As briefly discussed in the introductory part of the present description, the environment features model component 205*c* of the point-to-point field calculation procedure 205, represents a well known limit, which is intrinsically connected to the fact of considering only the punctual effects of building and greenery very close to the user terminal (i.e., in the same measure pixel) and limited to a single surface information (building density and morphological class, respectively), without taking into account building and greenery shielding effects due to previous pixels—i.e., the measure pixels before the (current) measure pixel including the (current) measure point(s) wherein the user terminal is placed—(unlike orographical obstacles diffraction model component 205*b* that, making use of global features of the whole orographical profile, considers also the previous pixels). In fact, to have recourse to a punctual parameter of a building (and greenery) percentage, entirely depending on the environment features of a single measure pixel, generates a total correlation between the measure pixel and the calculated field value, without substantially considering the environment features of the previous pixels. A clear example of such problem relates to the impossibility, for RASPUTIN algorithm (and generally for any macrocellular propagation algorithm that makes use of the model components of above), of distinguishing propagation channels, such as those that are encountered in urban center along buildings-surrounded streets that are "aligned" and "transversal" with respect to the directions of the wave front of the electromagnetic wave associated to the signal. More generally, the environment model for calculating the building (and greenery) effects on a single measure pixel implemented by RASPUTIN algorithm does not consider shielding effects caused by buildings (and greenery) located at the previous measure pixels; in this way, for the same other conditions, on a visible pixel (i.e., a measure pixel being not obstructed by buildings and/or greenery of the corresponding previous measure pixels) is forecast the same field value of an obstructed pixel (i.e., a measure pixel obstructed by buildings and/or greenery of the corresponding previous measure pixels).

Therefore, according to the Applicant, it is of the utmost importance to improve the model components of the point-to-point field Calculation procedure 205, with an estimation of the building effects that makes into consideration not a punctual contribution of a single measure pixel, but instead a volume contribution of each measure pixel as interacting with other pixels close thereto.

Figure 3:
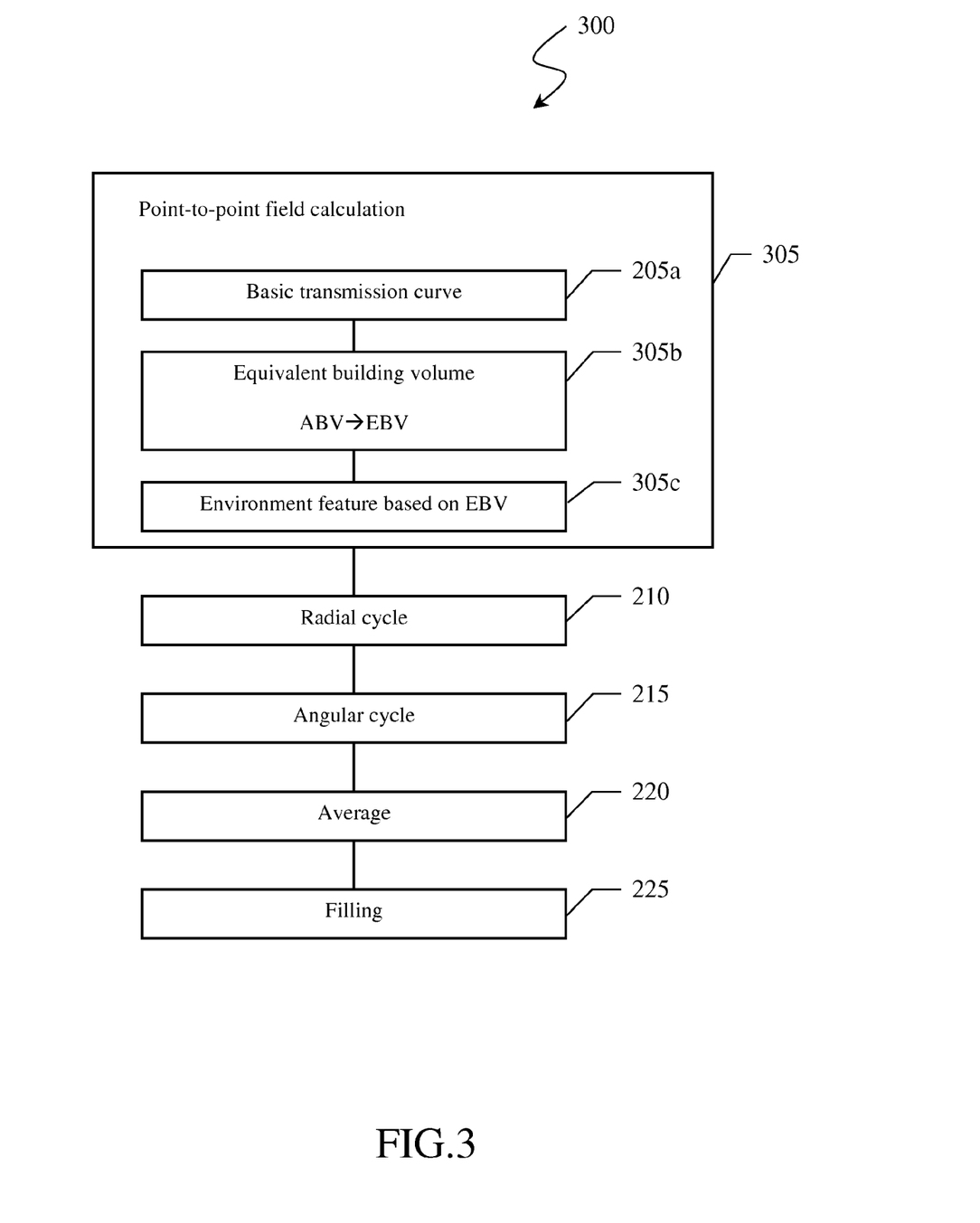
FIG. 3 schematically shows an operation flow of a propagation algorithm according to an embodiment of the present invention.

FIG. 3 schematically shows the operation flow of a propagation algorithm 300 according to an embodiment of the present invention. In the exemplary but not limiting embodiment herein disclosed, the propagation algorithm 300 is substantially based on the previous RASPUTIN algorithm, but it is clear that the principles of the present invention may be applied also to other preexisting algorithms.

More particularly, as visible in the figure, the propagation algorithm 300 includes the radial cycle procedure 210, the angular cycle procedure 215, the average procedure 220 and the filling procedure 225 of the known propagation algorithm, but, differently from the latter it includes a point-to-point field calculation procedure 305 calculating building volume information and the attenuation contribution based on such building volume information. More particularly, the point-to-point field calculation procedure 305 includes volume parameters computations and attenuation contributions computations based on model components depending on the computed volume parameters, as described below:

Basic transmission curve (205a); such model component is equivalent to that described in the foregoing, and represents the propagation equation that calculates the attenuation as a function of distance between the radio base station and the user terminal, working frequency, effective height of the radio base station with respect to the user terminal, and height of the user terminal with respect to the ground level.

Equivalent building volume computation (305b); such operation performs the calculation along each point of the radial between the radio base station and the user terminal of a corresponding average building volume ABV and, at the end of the radial, of an equivalent building volume EBV (with such operation that will be better explained in the following). For example, starting from a first position of the user terminal (first measure point), and moving in direction of the radio base station with a step equal to the radial sampling pitch (i.e., 25 m in the example at issue) thereby defining corresponding measure points following the first measure point, the average building volume ABV is calculated, for each current measure point (i.e., point under measure), by considering punctual building volumes of a predetermined number (e.g., 20) of measure points that are closest to, e.g., preceding, the current measure point and along the considered radial linking the radio base station and the user terminal. Finally, at the end of the path, the equivalent building volume is calculated from all the average building volume ABV values.

Environment features based on EBV (block 305c); such model component has the purpose of determining the attenuation contribution due to the equivalent building volume EBV, indicating the equivalent volume of buildings of the environment near the user terminal that may affect the field attenuation. As will be better described in the following, such model component is based on an building attenuation parametric curve (i.e., an attenuation curve depending on a specific parameter, the equivalent building volume in the embodiment described) or simply building parametric curve, to which is applied the computed EBV parameter for obtaining a corresponding equivalent building correction factor for fining the propagation attenuation given by the basic transmission curve 205a.

Therefore, it should be noted that the point-to-point field calculation procedure 305 is again based on the basic curve transmission, but to which a different regulating or correction contribution is applied that considers volume building effects, instead of a punctual building effect. Instead, the attenuation contribution due to orographic obstacles has been deliberately ignored, by assuming the (reasonable) hypothesis of splitting the shielding effects by orographic obstacles from shielding effects by buildings and greenery, thereby obtaining the equivalent building correction factor that depends mainly by building and greenery effects; in particular, this can be achieved, as will be better described in the following for calibration process discussion, by focusing on the measure pixels for which the orographic profile does not involve the provision of obstacles—such as for example in flat countries—and hence for which the attenuation contribution due to orographic obstacles can be ignored for the computation of the correction factor (however, the attenuation contribution due to orographic obstacles is effectively taken into account by the already existing RASPUTIN algorithm to which the present invention can be applied).

The use of the equivalent volume as an evaluation parameter of the attenuation contribution of the environment calculated exclusively in the path portion being nearest to the user terminal, by weighting mainly the volume contributions of the points being nearest thereto, has a solid theoretical motivation. The Huygens-Fresnel theory, in fact, based on the undulatory nature of the propagation phenomenon, provides for the calculation of the field as integral of the contributions of the fictitious sources, arranged on a generic surface between the radio base station and the user terminal. In the simplest case, the wave fronts (locus of the points with same phase) are circumferences, which form the so called Fresnel ellipsoid. In presence of partial occlusion of the ellipsoid, due to an obstacle, the fictitious sources of the occluded portion are not activated and only the not occluded sources give a contribution to the calculation of the electromagnetic field (in fact, by representing the Fresnel ellipsoid superimposed to the building volume along the path, it can be easily noticed that the path portion closest to the user terminal determines the greatest occlusions of the ellipsoid).

Figure 4:
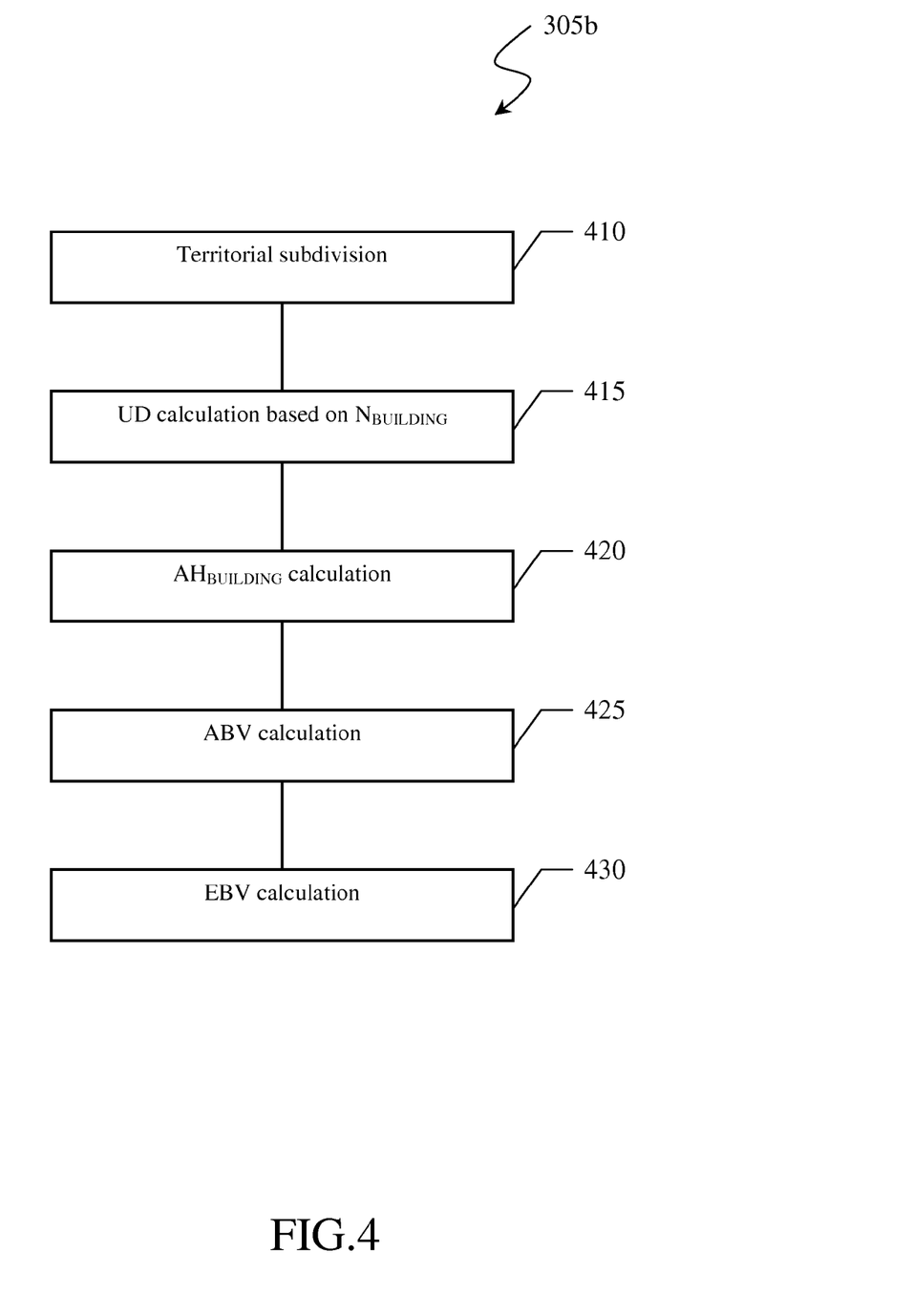
FIG. 4 schematically shows an operation flow of a procedure of the propagation algorithm of FIG. 3 according to an embodiment of the present invention.

Referring now to FIG. 4, there is schematically shown the operation flow of the equivalent building volume calculation procedure 305b according to an embodiment of the present invention. More particularly, the equivalent building volume calculation procedure 305b includes the following operations:

Territory subdivision (block 410): the territory is subdivided in low resolution pixels (for example, 2" in longitude and 1.5" in latitude, corresponding to about 50 m for 50 m).

Urbanized Density UD calculation (block 415); such parameter represent, for each low resolution pixel, the percentage of high resolution pixels included in each low resolution pixel that are occupied by buildings, and can be obtained from a number $N_{BUILDING}$ of high resolution pixels (for example, 1 m or 2 m) occupied by buildings provided by high resolution databases. More particularly, the UD parameter is calculated as follows:

$$UD = INT\left[\frac{N_{BUILDING}}{2500} * 100\right]$$

Therefore, by definition, the UD parameter is included in the range [0, 100].

Building Average Height ($AH_{BUILDING}$) calculation (block 420); such parameter, referred to the low resolution pixels, can be conveniently obtained from the available high resolution pixels (1 m or 2 m) databases. More particularly, the $AH_{BUILDING}$ parameter represents, for each low resolution pixel occupied more by buildings than by greenery (number $N_{GREENERY}$ of high resolution pixels occupied by greenery made available by high resolution databases), an average height of heights $H_j$ associated to the high resolution pixels included in the low resolution pixel occupied by buildings, and can be obtained by the available number $N_{BUILDING}$ as follows:

$$AH_{BUILDING} = INT\left[0.5 + \frac{1}{N_{BUILDING}}\sum_{j=1}^{N_{BUILDING}} H_j\right]$$

However, it should be noted that also the following condition must be satisfied:

if $N_{BUILDING}=0, AH_{BUILDING}=0$

In fact, if no high resolution pixels are provided that are occupied by buildings, all the more so no low resolution pixels, as "including" a certain number of high resolution pixels, are provided that are occupied by buildings.

Advantageously, in order to omit back-burner contributions of certain buildings, it is possible to set a minimum building height threshold for the $AH_{BUILDING}$ parameter, below which the buildings are not considered relevant for shielding purposes. For example, the minimum building height threshold may be set at about 3 m (corresponding to one floor), and below such threshold the $AH_{BUILDING}$ parameter is considered zero:

$AH_{BUILDING}=0$ if $AH_{BUILDING}<3$.

Therefore, if the minimum building height threshold is set for the $AH_{BUILDING}$ parameter, the latter may take the value 0 or values greater than or equal to 3 m.

average building volume ABV calculation (block 425); the ABV parameter on each low resolution pixel may be calculated as product between the UD parameter and the $AH_{BUILDING}$ parameter:

$ABV=UD*AH_{BUILDING}$

Equivalent Building Volume EBV calculation (block 430); the EBV parameter along the radial near the user terminal is defined as the average, weighted with the inverse of the distance from the user terminal, of the ABV parameters provided along the radial. The analytic formulation is the following:

$$EBV = \frac{\sum_{K=1}^{20} \frac{ABV_K}{D_K}}{\sum_{K=1}^{20} \frac{1}{D_K}}$$

wherein,

K is the index of the points of the radial (it is included between 1 and 20 in the example at issue), $D_K$ is the distance from the user terminal of the k-th point of the radial (the maximum value is 500 m and is a multiple of 25 m, in the example at issue), and $ABV_k$ is the average building volume in the k-th point of the radial.

It should be noted that the EBV parameter along the radial is fully calculated after the radial cycle procedure has ended, thus when all data ($ABV_k$) of each k-th point of the considered radial are available.

In the foregoing the proposed operation flow allows calculating low resolution $AH_{BUILDING}$ parameter from high resolution data (1 or 2 m). As it is known, the high resolution data could be available only in form of pieces corresponding to a predefined number of cities, whereas for the territory out from such pieces only low resolution data base of urbanized density could be available. For such reason, in order to obtain a good coverage area prediction, the Applicant also proposes a further operation flow (according to another embodiment of the present invention, not shown) for calculating the $AH_{BUILDING}$ parameter also in the territory out of the pieces, by substantially using the UD parameters available for the pieces. More particularly, such further operation flow may include the following operations:

generation of raster layers of average density and height of the buildings within the pieces. Such step is equivalent to that previously described, since relates again to the computation of the average density and height of the building starting from the high resolution data.

creation of a density-height correlation map within the pieces. For each building density, the corresponding average height value is associated, evaluated on all the low resolution pixels that have such density value.

extrapolation of the average height out of the pieces. The correlation map is used for generating the average height layer of the buildings at low resolution in the areas out of the pieces; to each value of building density, the corresponding value of average height in the correlation map is associated.

Once calculated the EBV, such parameter has to be introduced in the building parametric curve of above, which depends on the EBV parameter, thereby obtaining the equivalent building correction factor (so as to be able to adjust the basic transmission curve according to such correction factor). In order to do that, a calibration process for the propagation algorithm is used upstream for calculating the building parametric curve to which apply the computed EBV parameter.

Figure 5:
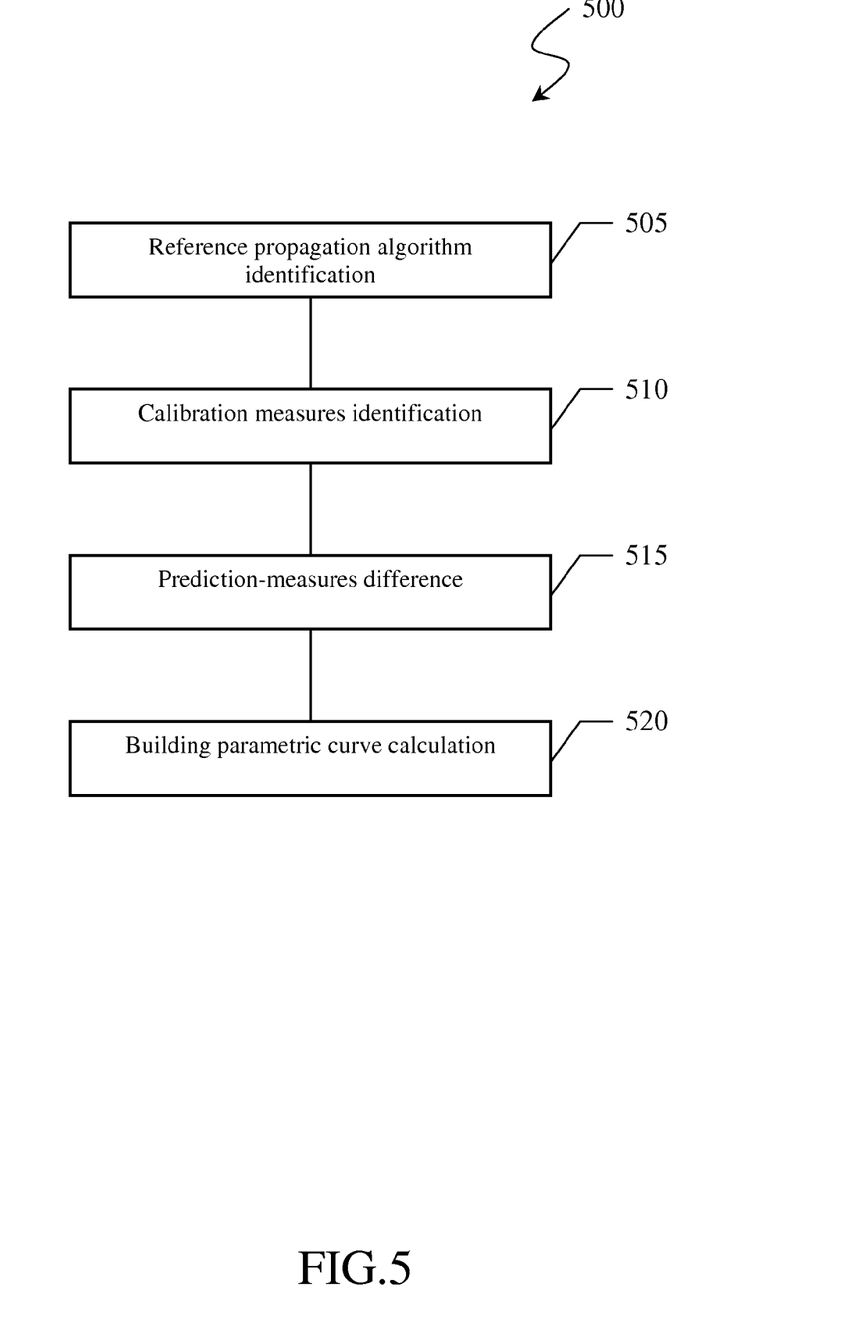
FIG. 5 schematically shows an operation flow of a calibration process according to an embodiment of the present invention.

In this respect, FIG. 5 schematically shows an operation flow of a calibration process 500 according to an embodiment of the present invention, the calibration process 500 allowing obtaining the parametric curve as a function of the EBV parameter. In the exemplary embodiment described, the calibration process 500 is substantially based on the old RASPUTIN propagation algorithm, and includes the following operations.

Reference propagation algorithm identification (block 505); such algorithm is obtained from old RASPUTIN algorithm by
a) maintaining the basic transmission curve of a stable component not subject to modifications,
b) "eliminating" the diffraction contribution from orographic obstacles (the principle of separation of the effects is applied), i.e., by performing the calibration process on the pixels for which the orographic profile does not involve the provision of obstacles—such as for example in flat countries—and hence for which the contribution due to diffraction by orographic obstacles can be ignored,
c) eliminating the punctual effect of percentage of building and morphology, and
d) calculating the equivalent building volume, in such a way that it can be output, without being able to associate thereto the corresponding attenuation.

Calibration measures identification (block 510); a set of measures adapted to the calibration of the equivalent building volume contribute is considered. Such set of measures includes continuous wave measures and network in exercise measures. For analogy with the reference propagation algorithm, the measures of diffraction by orographic obstacles are erased, i.e., filtered (for example, by erasing the measured pixels wherein the tight rope model provides a significant diffraction contribution—such as greater than 3 dB).

Prediction-measure difference (block 515); a calculation of the distribution of the difference between the prediction and the measure as a function of the equivalent building volume is performed. For each measure pixel the difference between field prediction obtained with the reference propagation algorithm and the corresponding field measure is calculated.

Building parametric curve calculation (block 520). Starting from the trend of the differences as a function of the equivalent building volume, it is possible to obtain the interpolating (trendline) that minimizes the standard deviation. Assuming that the calculated differences are all due to the absence of the attenuation contribution by equivalent building volume, such contribution is represented by the trendline itself, that minimizes the standard deviation of the deviation between predictions and measures.

Figure 6:
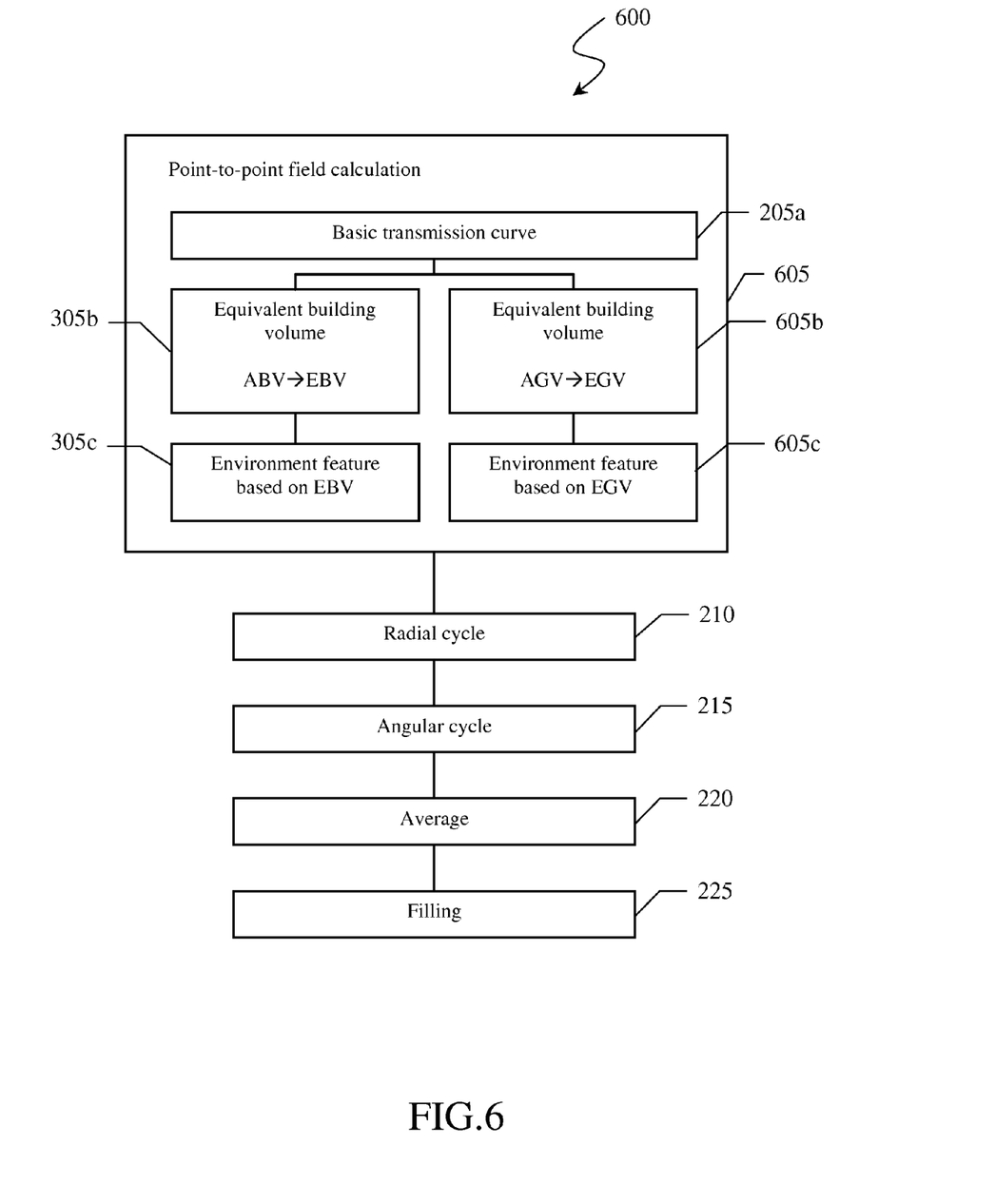
FIG. 6 schematically shows an operation flow of a propagation algorithm according to another embodiment of the present invention, FIG. 7 schematically shows an operation flow of a procedure of the propagation algorithm of FIG. 6 according to an embodiment of the present invention, and FIG. 8 schematically shows an operation flow of a further calibration process according to another embodiment of the present invention.

With reference now to FIG. 6, the latter schematically shows the operation flow of a propagation algorithm 600 according to another embodiment of the present invention. The propagation algorithm 600 is substantially equivalent to the propagation algorithm shown in FIG. 3, but differs from the latter for a more complete point-to-point field calculation procedure 605, which also takes into account, as will be better described shortly, greenery obstruction effects.

Generally speaking, the point-to-point field calculation procedure 605 computes both building volume parameters computations and greenery volume parameters, and calculates attenuation contributions based on corresponding parametric curves depending on the building and greenery volume parameters, as described below (with corresponding or equal elements that are denoted by same references and whose explanation is omitted for the sake of exposure brevity):

Basic Transmission Curve (205a);
Equivalent building volume computation (305b);
Equivalent greenery volume computation (605b) such operation performs the calculation along each measure point of the path between the radio base station and the user terminal of a corresponding average greenery volume AGV, and at the end of the path an equivalent greenery volume EGV along the path (with such operation that will be better explained in the following). For example, and analogously to the equivalent building volume computation, starting from the first position of the user terminal (first measure point), and moving in direction of the radio base station with a step equal to the radial sampling pitch (i.e., 25 m in the example at issue) thereby defining the corresponding measure points following the first measure point, the average greenery volume AGV is calculated, for each current measure point, by considering punctual greenery volumes of a predetermined number (e.g., 20) of measure points that are closest to, e.g., preceding, the current measure point and along the considered radial linking the radio base station and the user terminal. Finally, at the end of the path, the equivalent greenery volume is calculated from all the average greenery volume AGV values.

Environment based on EBV (block 305c);
Environment based on EGV (block 605c) such model component has the purpose of determining the attenuation contribution due to the equivalent greenery volume EGV, indicating the equivalent volume of greenery of the environment near the user terminal that may affect the field attenuation. As will be better described in the following, such model component is based on a greenery attenuation parametric curve (i.e., an attenuation curve depending on a specific parameter, the equivalent greenery volume in the embodiment described) or simply greenery parametric curve, to which is applied the computed EGV parameter for obtaining a corresponding equivalent greenery correction factor for fining the propagation attenuation given by the basic transmission curve 205a.

Radial cycle (block 210)
Angular cycle (block 215)
Average (block 220)
Filling (block 225)

In this way, the propagation algorithm includes two correction factors, that is the equivalent building correction factor depending on the EBV and an equivalent greenery correction factor depending on EGV parameter (thereby obtaining a more precise and reliable prediction of coverage area).

Figure 7:
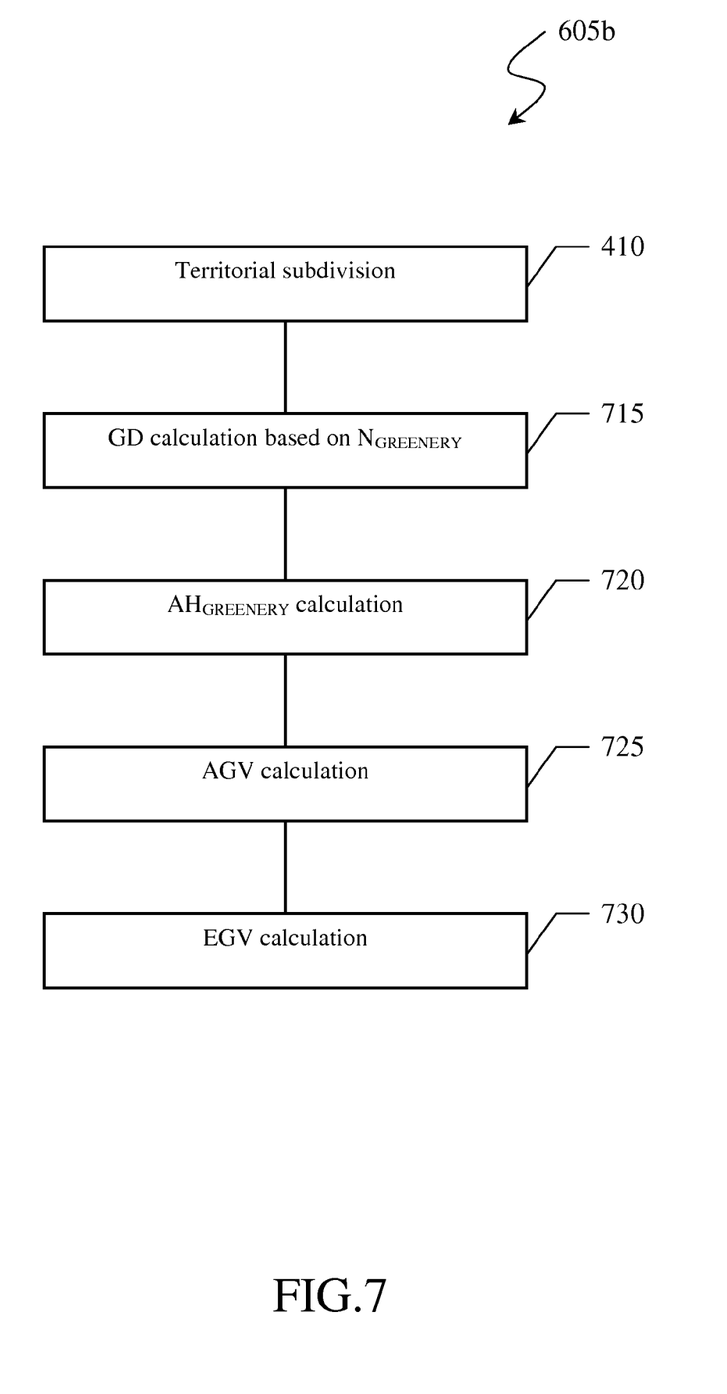

Referring now to FIG. 7, there is schematically shown the operation flow of the equivalent greenery volume calculation procedure 605b according to an embodiment of the present invention. More particularly, the equivalent greenery volume calculation procedure 305b includes the following operations:

Territory subdivision (block 410);
Greenery Density GD calculation (block 715); such parameter represent, for each low resolution pixel, the percentage of high resolution pixels included in each low resolution pixel that are occupied by greenery, and can be obtained from the number $N_{GREENERY}$ of high resolution pixels (for example, 1 m or 2 m) occupied by greenery provided by high resolution databases. More particularly, the GD parameter is calculated as follows:

$$GD = INT\left[\frac{N_{GREENERY}}{2500} * 100\right]$$

Greenery average height ($AH_{GREENERY}$) calculation (block 720); such parameter, referred to the low resolution pixels, can be conveniently obtained from the available high resolution pixels (1 m or 2 m) databases. More particularly, the $AH_{GREENERY}$ parameter represents, for each low resolution pixel occupied by greenery (number $N_{GREENERY}$ of high resolution pixels occupied by greenery made available by high resolution databases), an average height of heights $H_j$ associated to the high resolution pixels included in the low resolution pixel occupied by greenery, and can be obtained by the available number $N_{GREENERY}$ as follows:

$$AH_{GREENERY} = INT\left[0.5 + \frac{1}{N_{GREENERY}} \sum_{j=1}^{N_{GREENERY}} H_j\right]$$

Average greenery volume AGV calculation (block 725); on each low resolution pixel the AGV parameter may be calculated as product between the GD parameter and the $AH_{GREENERY}$ parameter:

$$AGV = GD * AH_{GREENERY}$$

Equivalent greenery Volume EGV calculation (block 730); the EGV parameter along the path near the user terminal is defined as the average, weighted with the inverse of the distance from the user terminal, of the ABV parameters provided along the radial. The analytic formulation is the following:

$$EGV = \frac{\sum_{K=1}^{20} \frac{AGV_K}{D_K}}{\sum_{K=1}^{20} \frac{1}{D_K}}$$

wherein,

K is the index of the points of the radial (it is included between 1 and 20 in the example at issue), $D_K$ is the distance from the user terminal of the k-th point of the radial (the maximum value is 500 m and is a multiple of 25 m, in the example at issue), and $AGV_k$ is the average greenery volume in the k-th point of the radial.

Figure 8:
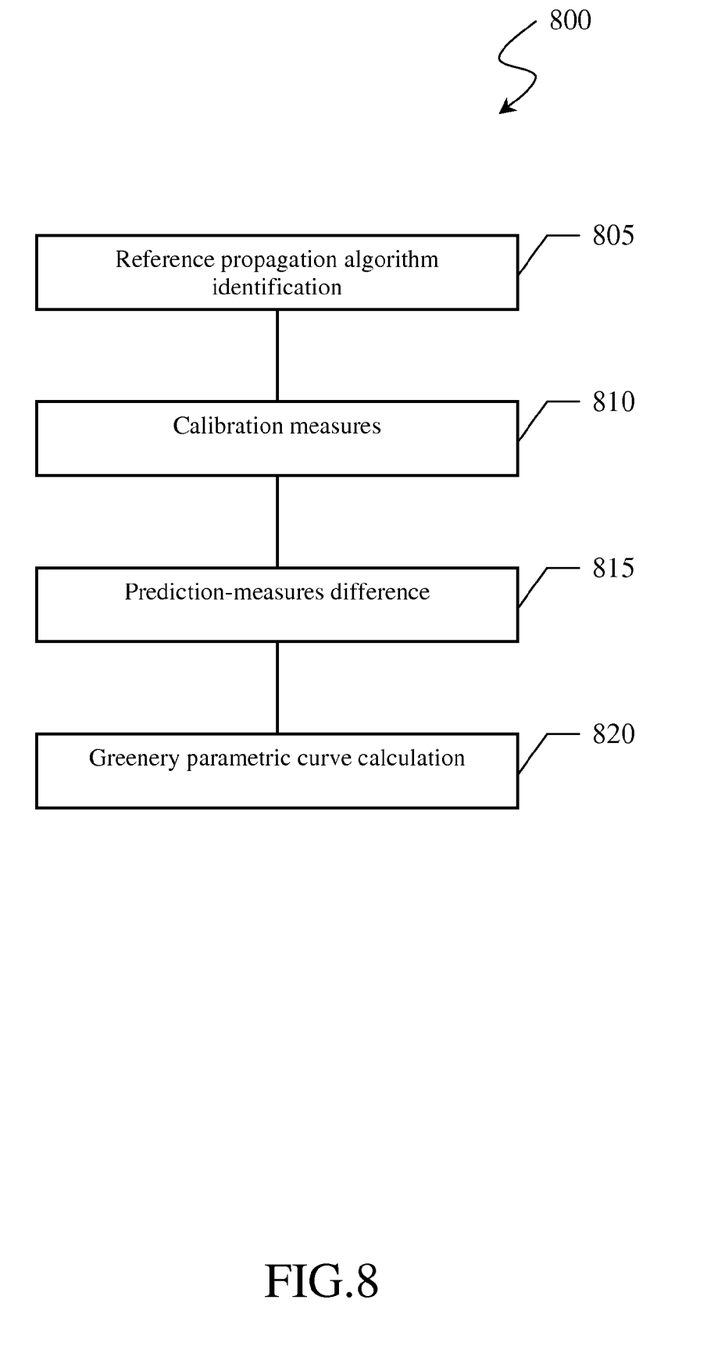

Referring now to FIG. 8, it schematically shows an operation flow of a further calibration process 800 according to another embodiment of the present invention. More particularly, the calibration process 800 allows obtaining the greenery parametric curve that the block 605c of the point-to-point field calculation procedure 605 uses for calculating the equivalent greenery correction factor depending on the EGV parameter. In the exemplary embodiment described, the calibration process 800 is substantially based on the RASPUTIN propagation algorithm, and includes the following operations:

Reference propagation algorithm identification (block 805); such algorithm is obtained from old RASPUTIN algorithm by
a) maintaining the basic transmission curve of a stable component not subject to modifications,
b) eliminating the diffraction contribution from orographic obstacles (the principle of separation of the effects is applied), i.e., by performing the calibration process on the pixels for which the orographic profile does not involve the provision of obstacles—such as for example in flat countries—and hence for which the contribution due to diffraction by orographic obstacles can be ignored,
c) eliminating the punctual effect of percentage of building and morphology, and
d) calculating the equivalent greenery volume, in such a way that it can be output, without being able to associate thereto the corresponding attenuation.

Calibration measures identification (block 810); a set of measures adapted to the calibration of the equivalent greenery volume contribute is considered. Such set of measures includes continuous wave measures and network in exercise measures. For analogy with the reference propagation algorithm, the measures of diffraction by orographic obstacles are erased, i.e., filtered (for example, by erasing the measured pixels wherein the tight rope model provides a significant diffraction contribution—such as greater than 3 dB). The measures usable for the calibration of the greenery equivalent volume contribution are usually a subset of those used for calibrating the distributed building. This is due the availability of greenery database, which is limited to high resolution pieces (corresponding to a limited number of areas).

Prediction-measure difference (block 815); a calculation of the distribution of the difference between the prediction and the measure as a function of the equivalent greenery volume is performed. For each measure pixel the difference between field prediction obtained with the reference propagation algorithm and the corresponding field measure is calculated.

Greenery parametric curve calculation (block 820). Starting from the trend of the differences as a function of the equivalent greenery volume, it is possible to obtain the interpolating (trendline) that minimizes the standard deviation. Assuming that the calculated differences are all due to the absence of the attenuation contribution by equivalent greening volume, such contribution is represented by the trendline itself, that minimizes the standard deviation of the deviation between predictions and measures.

Thanks to the present invention, a new algorithm is obtained with better coverage area prediction performance, since volumetric parameters are considered instead of punctual ones. Moreover, the new algorithm can be implemented in old existing algorithms, thereby improving them without substantial additional cost and time waste; in this respect, although in the present description explicit reference has been made to a new algorithm based on the existing RASPUTIN algorithm, nothing prevents from using the principles of the invention herein disclosed for improving performance of other existing algorithms.

The invention claimed is:

1. A method for predicting coverage area of a radiocommunications network including a plurality of network cells distributed over a geographic area, the method comprising:
   calculating by simulation, in circuitry, an irradiated electromagnetic field irradiated by a radio base station of the network in a plurality of measure locations within the geographic area corresponding to respective expected positions of a user terminal; and
   allocating radio resources in the radiocommunications network in accordance with said calculating,
   wherein said calculating comprises, for each of said measure locations:
      calculating a basic transmission curve indicative of a basic attenuation of a radioelectric signal strength in the measure location,
      associating to the basic transmission curve at least one correction factor for refining the radioelectric signal strength basic attenuation by taking account of shielding effects on the radioelectric signal strength due in obstacles to the propagation of the radioelectric signal,
   wherein said associating to the basic transmission curve said at least one correction factor includes:
      calculating for the measure location at least one equivalent volume parameter indicative of an equivalent volume of said obstacles taking into account a plurality of neighbor elementary areas in a prescribed neighborhood relationship to a measure elementary area to which the measure location is associated, and
      calculating an equivalent volume correction factor by associating each one of the at least one equivalent volume parameter to a corresponding parametric curve expressing the signal attenuation as a function of the respective at least one equivalent volume parameter.

2. The method according to claim 1, wherein the at least one correction factor includes an equivalent building correction factor indicative of shielding effects due to building obstacles present within the measure elementary area to which the measure location is associated and the corresponding neighbor elementary areas.

3. The method according to claim 2, wherein said calculating a basic transmission curve comprises:
   performing a point-to-point field calculation between the radio base station and the measure location,
   performing a radial cycle procedure including a repetition of the point-to-point field calculation procedure on measure locations, identified by a predefined radial sampling pitch, that are placed along a selected radial included between the radio base station and a maximum distance of calculation,
   performing an angular cycle procedure including a repetition of the radial cycle procedure on all the radials placed at an angular distance equal to a predefined angular sampling pitch with respect to the selected radial,
   the method further including:
   calculating for each measure location of a considered radial an average building volume parameter that takes into account punctual building volumes of the corresponding measure elementary area and of a predetermined number of the neighbor elementary areas that are located between the radio base station and the measure elementary area along the considered radial;
   calculating, for each considered radial, an equivalent building volume parameter from all the average building volume parameters, by performing an average operation, weighted with an inverse of a linear distance from the radio base station, of all the average building volume parameters provided along the considered radial, and
   associating to a building parametric curve the computed equivalent building volume parameter for obtaining the corresponding equivalent building correction factor for fining a propagation attenuation given by the basic transmission curve.

4. The method according to claim 3, wherein a phase of calculating for each measure elementary area of a considered radial a corresponding average building volume parameter includes:
   subdividing a territory in first elementary areas having a first resolution, each first elementary area comprising a number of second elementary areas having a second resolution higher than the first resolution;
   computing, from a number of second elementary areas occupied by buildings provided by high resolution databases, a urbanized density parameter representing, for each first elementary area, a percentage of the number of second elementary areas included in each first elementary area that are occupied by buildings,
   computing a building average height parameter representing, for each first elementary area occupied mainly by buildings, an average height of heights associated to the second elementary areas included in the first elementary area occupied by buildings,
   computing the average building volume parameter by multiplying the urbanized density parameter to the building average height parameter.

5. The method according to claim 4, further including setting a minimum building height threshold for the building average height parameter, below which the building average height parameter is considered zero since the buildings are not considered relevant for shielding purposes.

6. The method according to claim 5, wherein the at least one correction factor further includes an equivalent greenery correction factor indicative of shielding effects due to greenery obstacles provided within the measure elementary area to which the measure location is associated and the neighbor elementary areas thereof.

7. The method according to claim 6, further including:
   calculating for each measure location of a considered radial an average greenery volume parameter that takes into account punctual greenery volumes of the corresponding measure elementary area and of a predetermined number of the neighbor elementary areas along the considered radial;
   calculating, for each considered radial, an equivalent greenery volume parameter from all the average greenery volume parameters, by performing an average operation, weighted with an inverse of a linear distance from the user terminal, of all the average greenery volume parameters provided along the considered radial, and
   associating to a greenery parametric curve the computed equivalent greenery volume parameter for obtaining the corresponding equivalent greenery correction factor for fining a propagation attenuation given by the basic transmission curve.

8. The method according to claim 7, wherein a phase of calculating for each measure location of a considered radial a corresponding average greenery volume parameter includes:

computing, from a number of second elementary areas occupied by greenery provided by high resolution databases, a greenery density parameter representing, for each first elementary area, a percentage of the number of second elementary areas included in each first elementary area that are occupied by greenery, computing a greenery average height parameter representing, for each first elementary area occupied by greenery, an average height of heights associated to the second elementary areas included in the first elementary area occupied by greenery, computing the average greenery volume parameter by multiplying the greenery density parameter to the greenery average height parameter.

9. The method according to claim 7, wherein a greenery parametric curve is obtained by a calibration process identifying calibration measures comprising:

identifying a reference propagation algorithm substantially based on the basic transmission curve, the reference propagation algorithm providing field prediction values;

identifying further calibration measures adapted to calibrate an equivalent greenery volume attenuation contribute, such further calibration measures including continuous wave measures and network in exercise measures;

computing a distribution of a difference between field prediction values and the further calibration measures as a function of the equivalent greenery volume;

calculating the greenery parametric curve, as an interpolating of a distribution that minimizes a standard deviation between the field predictions values and the further calibration measures.

10. The method according to claim 9, wherein the calibration measures and the further calibration measures are performed in regions that cat be considered substantially free from shielding effects due to obstacles different from buildings and greenery, respectively.

11. The method according to claim 3, wherein the building parametric curve is obtained by a calibration process comprising:

identifying a reference propagation algorithm substantially based on the basic transmission curve, the reference propagation algorithm providing field prediction values;

identifying calibration measures adapted to calibrate an equivalent building volume attenuation contribute, such calibration measures including continuous wave measures and network in exercise measures;

computing a distribution of a difference between field prediction values and the calibration measures as a function of the equivalent building volume;

calculating a building parametric curve, as an interpolating of the distribution that minimizes a standard deviation between the field predictions values and the calibration measures.

12. The method according to claim 1, wherein said calculating a basic transmission curve indicative of a basic attenuation of a radioelectric signal strength in a measure location includes calculating the basic transmission curve as a function of operative parameters comprising at least one between:

distance between the radio base station and the user terminal, working frequency, effective height of the radio base station with respect to the user terminal, height of the user terminal with respect to a ground level.

13. The method according to claim 1, wherein the at least one correction factor further includes an orographic correction factor indicative of shielding effects due to diffraction by orographic obstacles.

14. A non-transitory computer readable medium including computer executable instruction loadable into an internal memory of a computer with input units and. output units as well as with a processing unit, adapted to carry out the method according to claim 1, alone or in combination, when running in the computer.

15. A system for predicting coverage area of a radiocommunications network including a plurality of network cells distributed over a geographic area, the system comprising circuitry configured to:

calculate by simulation an irradiated electromagnetic field irradiated by a radio base station of the network in a plurality of measure locations within the geographic area corresponding to respective expected positions of a user terminal;

allocate radio resources in the radiocommunications network in accordance with said calculating;

calculate, for each of said measure locations, a basic transmission curve indicative of a basic attenuation of a radioelectric signal strength in the measure location;

associate, for each of said measure locations, at least one correction factor to the basic transmission curve for refining the radioelectric signal strength basic attenuation by taking account of shielding effects on the radioelectric signal strength due to obstacles to a propagation of the radioelectric signal;

calculate for the measure location at least one equivalent volume parameter indicative of an equivalent volume of said obstacles taking into account a plurality of neighbor measure elementary areas in a prescribed neighborhood relationship to a measure elementary area to which the measure location is associated; and calculate an equivalent volume correction factor by associating each one of the at least one equivalent volume parameter to a corresponding parametric curve expressing the signal attenuation as a function of the respective at least one equivalent volume parameter.

* * * * *